Dec. 2, 1930.  G. H. KAEMMERLING  1,783,717

PULVERIZER

Filed July 16, 1929

Gustav H. Kaemmerling
INVENTOR.

BY
ATTORNEYS.

Patented Dec. 2, 1930

1,783,717

UNITED STATES PATENT OFFICE

GUSTAV H. KAEMMERLING, OF ERIE, PENNSYLVANIA, ASSIGNOR TO ERIE CITY IRON WORKS, OF ERIE, PENNSYLVANIA, A CORPORATION OF PENNSYLVANIA

PULVERIZER

Application filed July 16, 1929. Serial No. 378,752.

With pulverizers utilizing rotary beaters and in connection therewith fans for drawing the material through the pulverizer and from which the powdered material is driven with the discharge of the fan to the point of use difficulty has been experienced with varying qualities of material pulverized in satisfactorily driving the material to the point of use. The present invention is designed to avoid this difficulty by introducing supplemental air to the fan, thus increasing the volume and velocity of the air in the delivery ducts and has special reference to improvement in the manner of introducing the added air. Features and details of the invention will appear from the specification and claims.

A preferred embodiment of the invention is illustrated in the accompanying drawings as follows:—

Figure 1:
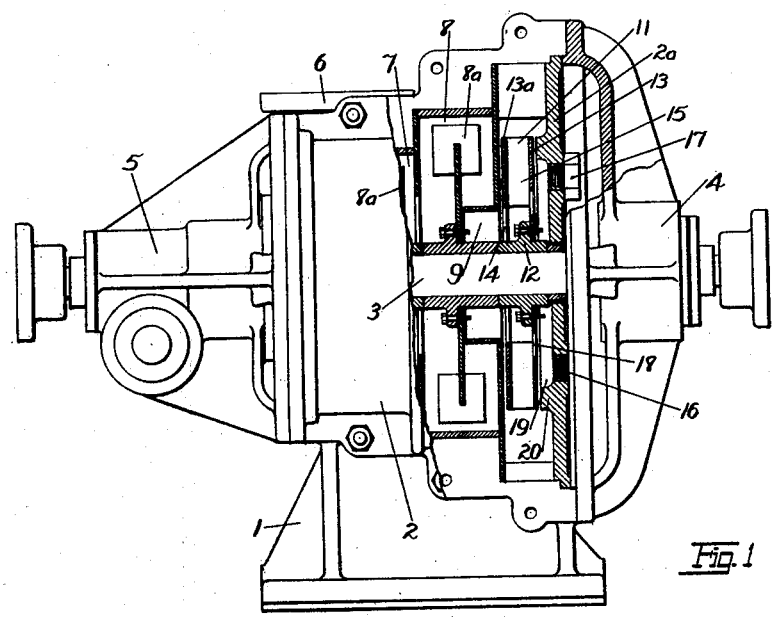

Fig. 1 shows a side elevation, partly in vertical section on the axis of the pulverizer.

Figure 2:
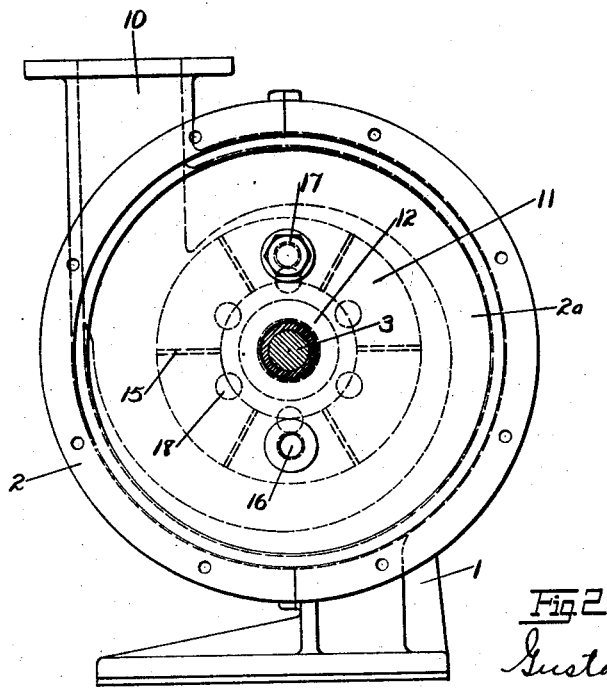

Fig. 2 an end view of the pulverizer.

1 marks the base of the device, 2 the case, 3 the pulverizer shaft, and 4 and 5 bearings in which the shaft is journaled. Material is delivered to an inlet at 6 and passes through pulverizer chambers 7 and 8, these chambers being provided with beaters 8a mounted on the shaft. An outlet 9 leads from the chamber 8 and material is discharged from the pulverizer at 10. A fan 11 is mounted on a hub 12, the hub 12 being fixed on the shaft. The fan has two discs 13 and 13a, the inner disc having an opening 14 communicating with the opening 9. Fan blades 15 are arranged between the discs 13 and 13a. These are radially disposed, as indicated in dotted lines, Fig. 2. The air is drawn from the chamber 8 by way of the passage 9, driven out between the discs and discharged to the fan discharge 10.

An opening, or openings 16 are provided in an end plate 2a of the pulverizer. Plugs 17 are provided so that these openings may be increased, or decreased, as the quality of the material may require. The disc 13 is provided with a series of openings 18. The openings 18 are preferably off-set from the openings 16 and a space 19 is provided between the disc 13 and the end plate 2a to afford a passage and air distributing chamber 19. The outer edge of this chamber is closed by an annular wall 20 which projects into close relation with the disc 13. The off-setting of the openings and the passage 19 prevents a sound-producing effect which results from placing these openings in the same radial position and with a limited passage between the openings.

In the operation of the apparatus, when wet material is being pulverized, or material which gives difficulty as to clogging of the discharge ducts, a plug, or some of the plugs 17 are removed and a sufficient amount of this added air is supplied to obviate the tendency for clogging in the discharge ducts. On the other hand, when the material being pulverized presents no such difficulty these openings 16 are closed so as to give the entire force of the fan to the pulverizer.

What I claim as new is:—

1. In a pulverizer, the combination of a beater chamber; a fan chamber to which the beater chamber leads, said fan chamber having an end wall with supplemental air openings therein; a fan in the chamber having a disc next to and spaced from the end wall, said disc having an opening receiving air from the opening in the end wall; and a closure ring surrounding the space between the disc and the end wall.

2. In a pulverizer, the combination of a beater chamber; a fan chamber to which the beater chamber leads, said fan chamber having an end wall with a supplemental air opening therein; a fan in the fan chamber having a disc next to the end wall, a disc next the beater chamber, and an opening through the disc next the beater chamber to receive air from the beater chamber; fan blades between said discs, the outer disc having an air opening receiving air from the opening in the end wall, said outer disc being spaced from the end wall; and a closure ring enclosing the space between the end wall and the disc.

In testimony whereof I have hereunto set my hand.

GUSTAV H. KAEMMERLING.